Nov. 6, 1928.
P. N. MOODY
1,690,790
CULTIVATOR
Filed July 7, 1926
2 Sheets-Sheet 1
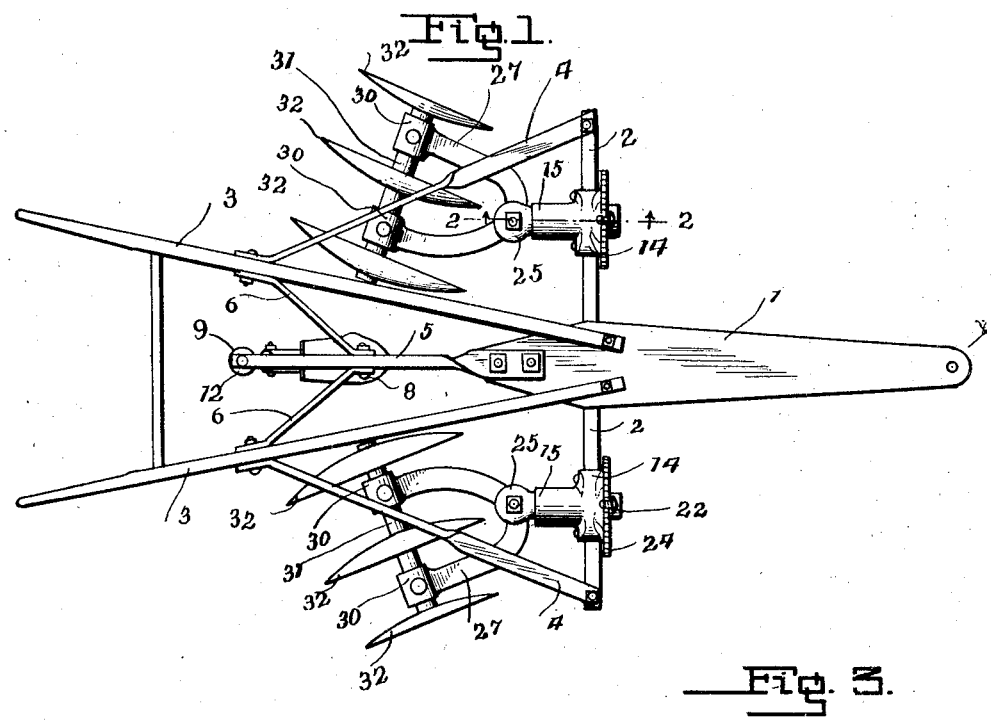
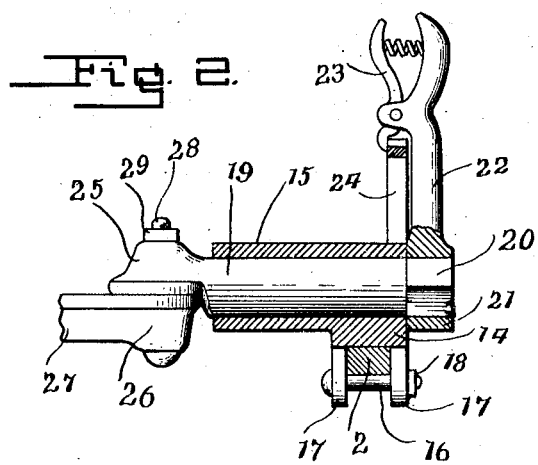
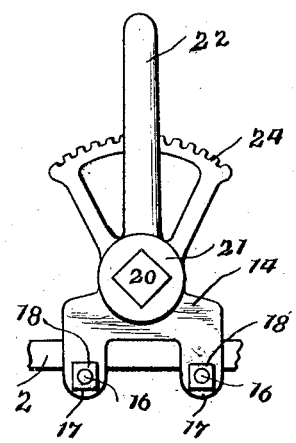
Inventor
P. N. Moody
By Lacey & Lacey, Attorneys Nov. 6, 1928.
P. N. MOODY
CULTIVATOR
Filed July 7, 1926       2 Sheets-Sheet 2
1,690,790
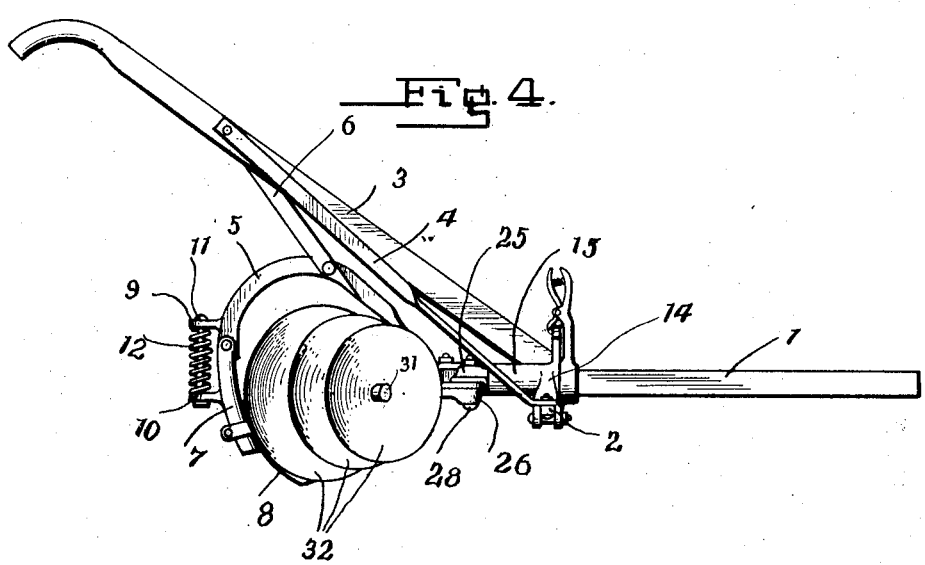
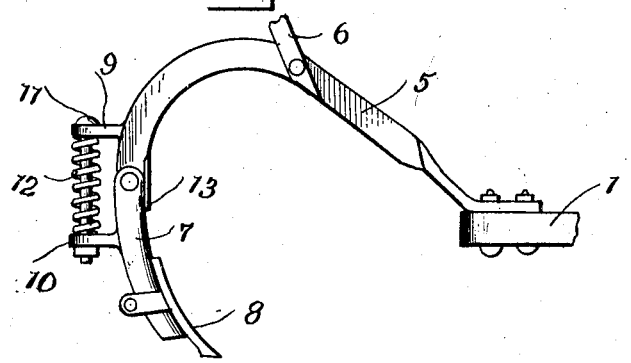
Inventor
P. N. Moody
By Lacey & Lacey, Attorneys Patented Nov. 6, 1928.

1,690,790

UNITED STATES PATENT OFFICE.

PERRIN N. MOODY, OF GILLIAM, MISSOURI.

CULTIVATOR.

Application filed July 7, 1926. Serial No. 120,990.

This invention relates to cultivators and has special reference to implements for cultivating between rows of standing corn. The machine may, however, of course, be used for cultivating other crops. One object of the invention is to provide a machine in which the soil-engaging elements may be readily adjusted to throw the loose dirt in either direction desired and also adjusted to conform to the inclination of the hills. A further object of the invention is to provide a machine in which the entire surface between rows will be cultivated and no ridge left between the paths traveled by the principal soil-engaging elements. Other objects of the invention will appear incidentally in the course of the following description, and the invention resides in certain novel features which will be particularly pointed out in the appended claim.

In the accompanying drawings:

Figure 1 is a plan view of a cultivator embodying my invention;

Fig. 2 is an enlarged detail section on the line 2—2 of Fig. 1;

Fig. 3 is a front elevation of the parts shown in Fig. 2;

Fig. 4 is a side elevation of the machine;

Fig. 5 is an enlarged detail side elevation of the central soil-engaging shovel or blade.

The frame of my improved machine comprises a beam 1 to the front end of which draft devices are to be attached. Near the rear end of this beam 1 cross bars 2 are secured to extend therefrom transversely and in alinement, these bars being preferably angular in cross section, as shown in Fig. 2. To the beam 1 near the rear end thereof, I secure handle members 3 which are of the usual form and are connected with the outer ends of the cross bars 2 by braces 4, as shown and as will be understood. To the rear end of the main beam 1, I secure a cultivator beam or shank 5 which is preferably of the arched form shown clearly in Figs. 4 and 5, and is connected with the handles 3 by the inner braces 6. To the rear extremity of the arched beam or shank 5 is pivotally secured the depending stem 7 having a cultivator shovel or blade 8 secured to its lower end. Above the pivotal connection of the stem 7, a lug 9 projects rearwardly from the beam or shank 5 and below said pivotal connection a similar lug 10 projects rearwardly from the stem 7. A stay bolt 11 is fitted through the said lugs and an expansion spring 12 is coiled around the bolt between the lugs and tends constantly to spread them apart so that the stem 7 and the blade or shovel 8 carried thereby will be projected forwardly. A stop rib 13 formed on the shank or beam 5 at its lower end extends in front of the stem 7 so that the stem impinges against the stop rib or shoulder under the influence of the spring 12 and is thereby limited in its forward movement. Should the shovel strike a large stone or other obstruction as the machine is drawn along the rows of plants, the spring 12 will yield to the impact so that the stem 7 may swing rearwardly and permit the shovel to ride over the obstruction, resuming its normal position under the influence of the spring when the obstruction has been passed.

The cross bars 2 project laterally from the opposite sides of the main longitudinal beam 1, as shown most clearly in Fig. 1, and upon each cross bar is mounted a head 14 having a sleeve or hub member 15 projecting rearwardly therefrom, the heads being secured upon the respective cross bars 2 by bolts 16 inserted through lugs 17 depending from the heads at the front and rear of the cross bars with the bolts immediately below the cross bars so that, when the nuts 18 thereon are turned home, the head will be firmly secured upon the cross bar. It will be understood that the heads may be set at any desired point of the respective cross bars so that the tools carried by these heads will be adjusted to the width between the rows. Fitted in each hub member 15 is a rock shaft 19 having a flat-sided front extremity 20 upon which is fitted the hub 21 of a handle or lever 22 which extends upwardly and is equipped with a latch 23 to cooperate with a rack 24 formed integral with or secured rigidly upon the respectively adjacent head 14 so that the rock shaft 19 may be set and held in any desired position. The rear extremity of the rock shaft is expanded laterally to provide a clamping head or lug 25 having a flat under face to mate with a similar lug or head 26 at the front end of a yoke 27, a bolt 28 being inserted centrally and vertically through the mating lugs 25 and 26 and secured by a nut 29 whereby the yoke 27 may be held in any desired relation to the lug 25. The yoke 27 is provided at its ends with bearing sleeves 30 and in the said sleeves is journaled a shaft or axle 31 carrying a gang of cultivator disks 32, it being noted that these disks are graduated in diameter thereby tending to conform to the inclination of the soil forming the hills or ridge from which the corn or other plants rise. As shown most clearly in Fig. 1, the shovel or blade 8 is arranged in longitudinal alinement with the main beam 1 and a gang of disks 32 is provided at each side of the machine so that as the machine is drawn along the field between adjacent rows of plants the soil will be loosened and will be thrown toward or from the plants according to the adjustment of the disks.

By rocking the shafts 19, the gangs of cultivator disks will be set at the desired inclination to the vertical and by adjusting the yokes 27 pivotally upon the bolts 28, the disks will be set at the desired angle to the draft so that the soil will not only be loosened but will be turned toward or from the plants as may be desired, and any weeds and other obnoxious growth will be cut through and destroyed and will be prevented from clinging to and clogging the disks. It is also to be noted that the shovel 8, being disposed to run upon the central line of the machine, will break up the ridge which is left at the center of the space between the rows of plants and remains uncultivated when other machines are used. My machine is exceedingly simple and compact, may be produced at a low cost, and is efficient in operation.

Having thus described the invention, I claim:

A cultivator comprising a beam, cross bars projecting from opposite sides of the beam, an arched shank projecting rearwardly from the beam and having a shovel at its lower rear end, handle members extended upwardly and rearwardly from the rear end of the beam, braces between the outer ends of the cross bars, and the respective handle members, other braces between the handle members and the said arched shank, heads slidable on the cross bars, shafts mounted in the heads and pivotally adjustable therein, yokes pivoted to the shafts, and gangs of soil-engaging elements carried by the yokes and disposed upon opposite sides of the shank and adapted to coact with the shovel thereof.

In testimony whereof I affix my signature.

PERRIN N. MOODY. [L. S.]